US005195015A

United States Patent [19]

Kaczmarek

[11] Patent Number: 5,195,015

[45] Date of Patent: Mar. 16, 1993

[54] LINE PROTECTOR FOR A COMMUNICATIONS CIRCUIT

[75] Inventor: Richard T. Kaczmarek, Chicago, Ill.

[73] Assignee: Reliance Comm/Tec Corporation, Chicago, Ill.

[21] Appl. No.: 665,660

[22] Filed: Mar. 7, 1991

[51] Int. Cl.[5] ........................ H02H 3/22; H02H 9/06

[52] U.S. Cl. .................................... 361/119; 361/124; 337/32

[58] Field of Search ................. 361/56, 111, 104, 103, 361/119, 117, 118, 124, 125; 379/331; 337/32

[56] References Cited

U.S. PATENT DOCUMENTS

| | | | |
|---|---|---|---|
| 3,743,888 | 7/1973 | Baumbach | 317/16 |
| 3,794,947 | 2/1974 | Baumbach | 337/32 |
| 3,849,750 | 11/1974 | Baumbach et al. | 337/32 |
| 3,886,411 | 5/1975 | Klayum | 317/62 |
| 3,975,664 | 8/1976 | Baumbach | 317/66 |
| 4,128,855 | 12/1978 | Gilberts | 361/119 |
| 4,208,694 | 6/1980 | Gilbert | 361/119 |
| 4,241,374 | 12/1980 | Gilberts | 361/124 |
| 4,314,304 | 2/1982 | Baumbach | 361/124 |
| 4,502,088 | 2/1985 | Baumbach | 361/124 |

OTHER PUBLICATIONS

Reliable Electric Utility Products Central Office Equipment, pp. COE-61 through COE-64, copyright 1988.

*Primary Examiner*—Steven L. Stephan
*Assistant Examiner*—Adolf Berhane
*Attorney, Agent, or Firm*—Trexler, Bushnell, Giangiorgi & Blackstone, Ltd.

[57] ABSTRACT

A line protector for a communications circuit comprises a housing, an over-voltage arrester received in said housing and having axially opposite electrodes and a ground strip for coupling one of the electrodes to electrical ground. An over-current arrester has at least one line contact for electrically contacting a communications line. A conductive sleeve electrically contacts a second communications line to be joined with the first communications line, the sleeve also being assembled with the over-current arrester and with the over-voltage arrester, such that the over-voltage arrester is held within the housing. The sleeve has projecting fingers for completing an electrical circuit between the second communications line and the other of the electrodes of the over-voltage arrester. A ground assembly is assembled with the sleeve within the housing and generally intermediate the over-current arrester and the over-voltage arrester for contacting the ground strip and providing a ground surface in an area intermediate the over-voltage arrester and the over-current arrester for grounding the second communications line which is in electrical contact with the line contact upon occurrence of an over-current condition.

17 Claims, 4 Drawing Sheets

LINE PROTECTOR FOR A COMMUNICATIONS CIRCUIT

BACKGROUND OF THE INVENTION

This invention relates generally to the telecommunications arts and more particularly to line protectors for telecommunications circuits.

Generally speaking, a telephone line is made up of a pair of wires or conductors which are referred to as tip (T) and ring (R). In the telephone central office (C.O.), line protector devices are provided to protect the central office equipment from over-voltages and sometimes also from over-current which may occur on the incoming telephone line. The type of protection needed at the central office depends on the susceptibility of the incoming telephone lines to over-voltage conditions either alone or in combination with over-current conditions.

The incoming line pairs are connected to the T and R conductors of the C.O. equipment pairs at a connector block. Appropriate protector or protection devices are installed in the connector block so as to provide the desired over-voltage, and if desired also over-current protection for the incoming line pairs. Generally speaking, a separate protector device is used for each of the T and R conductors of each line pair. These protectors are interposed between each conductor of the pair and a ground circuit, such that upon the occurrence of an over-voltage condition of a specified magnitude, and, if desired, an over-current condition of a specified magnitude and/or duration, the incoming line will be momentarily or permanently shorted to ground. Generally speaking, a brief over-voltage condition will cause a temporary grounding of the affected line, until the condition has passed. On the other hand, an over-current condition of specified magnitude and/or duration often causes a permanent grounding of the incoming line which has experienced the over-current condition. In the latter case, it is necessary to remove and replace the protector device on the line which has experienced an over-current condition.

Prior art protector devices have utilized both a carbon-arc type and gas tube type over-voltage protectors. In each of these types of protectors, upon an occurrence of an over-voltage condition over or above a specified magnitude, an arc is passed across the device to cause a temporary grounding of the line on which the over-voltage condition has occurred. In order to protect against over-current conditions, the gas tube or carbon-arc arrester is normally combined with a heat-sensitive device. The latter heat-sensitive device is generally mechanically coupled and often spring-loaded within a connector block to short the incoming line to ground upon occurrence of a specified over-current condition which is sufficient to heat the heat-sensitive device beyond a predetermined threshold point. This threshold point is generally selected to correspond to the amount of heat produced by the over-current condition of specified duration. Usually, the heat-sensitive device is not a resetable or recoverable device and hence the protector unit must be replaced upon occurrence of an over-current condition sufficient to trip the heat-sensitive over-current protection device.

Other devices such as a vent-safe type gas tube or solid state over-voltage arrester have been utilized in the art. A vent-safe arrester generally provides a secondary or backup gap for over-voltage arcing to occur if for some reason the gas tube should vent and fail to arc. The secondary or backup gap assures that the over-voltage arrester will still conduct an over-voltage to ground at voltage level which provides adequate protection for the central office equipment.

One particularly well-known and successful type of prior connector block is known as the 300-type block and is often provided with protector units of the so-called 1A type. The 1A type of protector unit may provide over-voltage protection only or it may protect the associated conductor against both over-voltage and over-current conditions. While the 300-type block and 1A type protector unit have been widely accepted, there is nevertheless room for further improvement.

OBJECTS AND SUMMARY OF THE INVENTION

Accordingly, it is a general object of this invention to provide a novel and improved protector unit for use with a 300-type connector block which will provide a gas tube arrester including vent-safe protection features, and also provide over-current protection.

A related object is to provide a novel protector in accordance with the foregoing object which is substantially similar in external dimensions to protectors heretofore used with a 300-type block so as to interfit with and operate in the same receptacles for currently used protector units in a 300-type block, and yet provide the improved features of the above object.

A related object is to provide an improved protector unit in accordance with the foregoing objects which is relatively simple and inexpensive to manufacture and produce, presenting but a minimum number of relatively simply constructed and easy to assemble parts, and yet is highly reliable in operation.

Briefly, and in accordance with the foregoing objects, a line protector for a communications circuit in accordance with the invention comprises a housing; an over-voltage arrester received in said housing and having axially opposite electrodes; a ground strip for coupling one of said electrodes to electrical ground; an over-current arrester having at least one line contact for electrically contacting a communications line; a conductive sleeve for electrically contacting a second communications line to be joined with said first communications line, said sleeve also being assembled with said over-current arrester and with said over-voltage arrester, such that said over-voltage arrester is held within said housing; said sleeve having projecting fingers for completing an electrical circuit between said second communications line and the other of said electrodes of said over-voltage arrester; and a ground assembly assembled with said sleeve within said housing and generally intermediate said over-current arrester and said over-voltage arrester for contacting said ground strip and providing a ground surface in an area intermediate said over-voltage arrester and said over-current arrester for grounding said second communications line which is in electrical contact with said line contact upon occurrence of an over-current condition.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawing in which like reference numerals identify like elements, and in which:

DETAILED DESCRIPTION OF THE ILLUSTRATED EMBODIMENT

Figure 1:
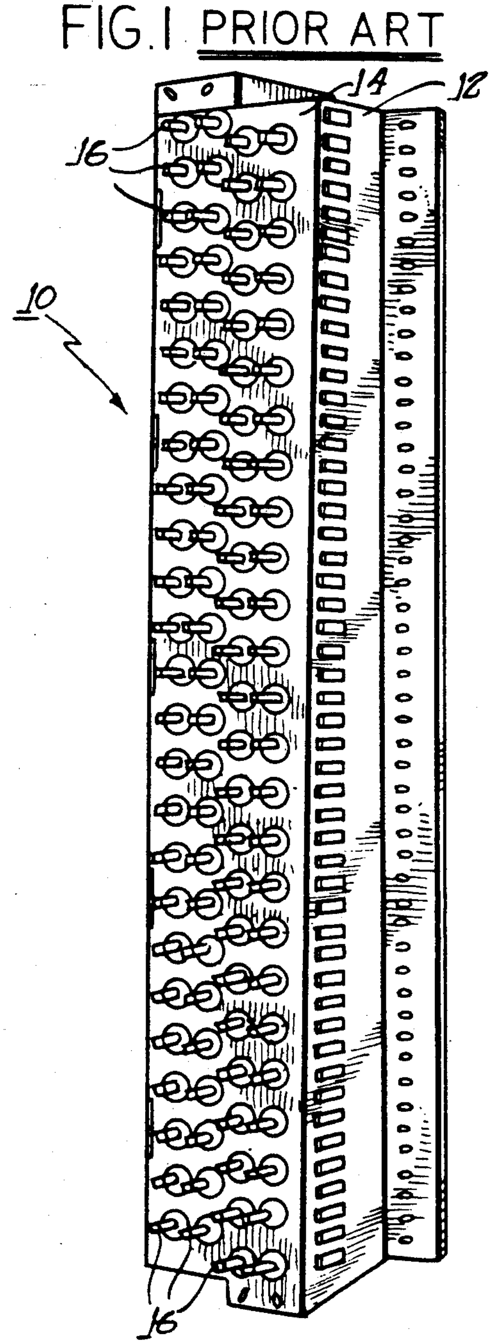
FIG.1 PRIOR ART
FIG. 1 is a perspective view of a connector block in connection with which the novel protector device of the invention may advantageously be utilized.

Referring initially to FIGS. 1 through 4, the configuration of a connector block provided with protection devices in accordance with the prior art will initially be described. Incoming telephone line pairs, each consisting of a tip (T) and ring (R) conductor from a subscriber's line are connected to the corresponding T and R conductors of corresponding central office (C.O.) pairs at a connector block 10. One example of such a prior art connector block, known generally as the 300-type, is illustrated in FIG. 1. The respective conductors from the subscriber's line and from the corresponding central office line are connected at the rear of the block. The block 10 comprises a non-conductive and preferably molded plastic base or housing portion 12 on which is mounted a conductive and preferably metal faceplate 14. The plate 14 is electrically coupled to electrical ground.

Figure 2:
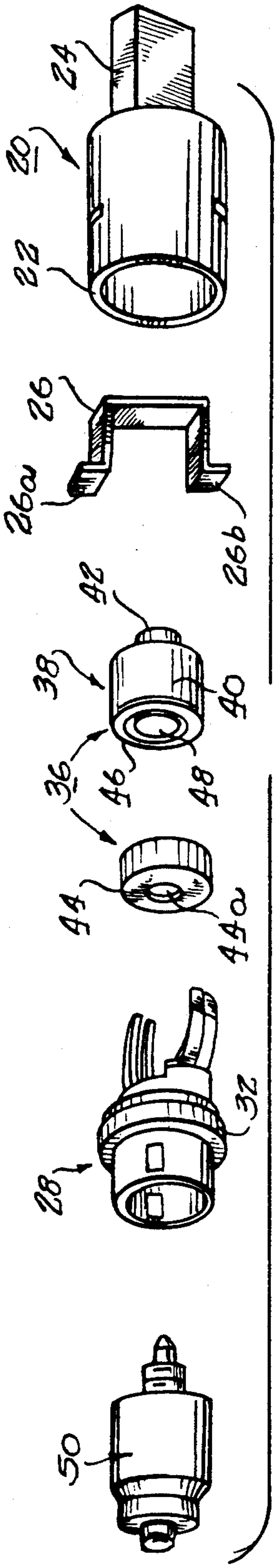
FIG.2 PRIOR ART
FIG. 2 is an exploded perspective view of a typical protector device in accordance with the prior art.

The block 10 has a number of receptacles 15 (see FIG. 5), each of which receives a protection device or protector 16. There is one receptacle and one protector for each of the conductors of each telephone line pair. The 300-type connector block shown in FIG. 1 can protect up to 50 line pairs, and therefore, it has 100 receptacles 15 which can accept up to 100 protectors 16. An individual pair of receptacles 15, designated by reference numerals 15*a* and 15*b* are illustrated in further detail together with a protector unit 16*a*, in FIG. 5, which will be described in further detail hereinbelow. The protectors 16 illustrated in FIGS. 1 through 4 are of the prior art type generally known as 1A type. 1A protectors may be provided in one of several different forms. For example, the 1A protector may protect its associated conductor against over-voltages only, or it may protect that conductor against both over-voltages and over-currents. Alternatively, a 1A type protector may be provided as a dummy unit and provide no protection at all. An example of one of these types of prior art protector units is shown in FIG. 2 in exploded perspective view.

Referring now to FIG. 2, the protector unit 16 includes a non-conductive and preferably plastic cap 20. The cap 20 has a cylindrical cup-like portion 22 and a projecting finger-grip portion 24 to permit manual insertion and removal of the protector 16 relative to the receptacle 15. The cylindrical cup-like portion 22 receives a generally U-shaped conductive strip 26 which has oppositely, outwardly projecting end tabs 26*a*, 26*b*, which project outwardly from the cylindrical cup-like portion 22 of the housing when the conductive strip is assembled therewith, as is shown for example in FIG. 4.

Figure 3:
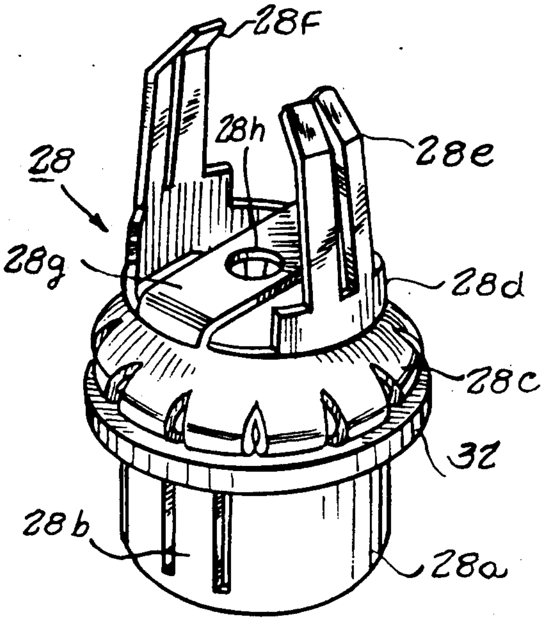
FIG.3 PRIOR ART
FIG. 3 is an enlarged perspective view of a sleeve portion of the assembly of FIG. 2.
Figure 4:
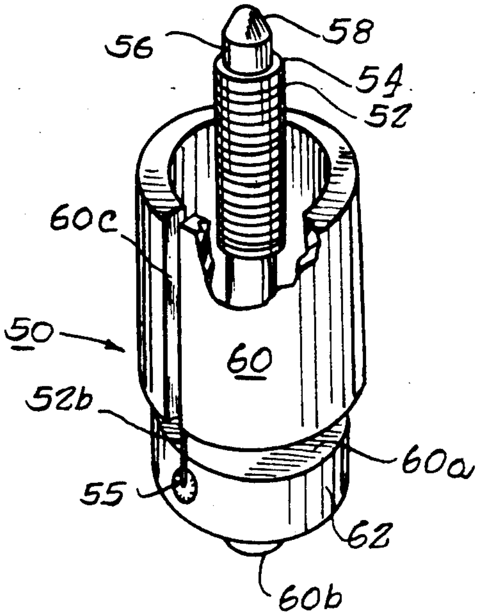
FIG.4 PRIOR ART
FIG. 4 is an enlarged perspective view of a heat coil assembly portion of the protector of FIG. 2.

A sleeve assembly 28 has a cylindrical base portion 28*a* which has formed therein a number of inwardly projecting spring arms 28*b* which receive and engage a heat coil assembly 50 which will be described hereinbelow. Reference is also invited to FIG. 3 wherein further details of the sleeve 28 are illustrated. Preferably the sleeve is formed of a single piece of conductive and preferably metallic material. The cylindrical portion flows into a radially outwardly extending and also generally cylindrical rim portion 28*c* of greater diameter than cylindrical portion 28*a*. The sleeve 28 is preferably formed from a flat sheet of material and thereafter formed into the configuration illustrated in FIG. 3.

In order to hold the sleeve 28 in the generally cylindrical configuration shown, an additional washer member 32 is fitted around the the cylindrical base or body portion 28*a* and slid upwardly to abut and engage the radially outward projecting rim portion 28*c*. An upper portion of radially projecting rim 28*c* extends into a further cylindrically configured portion 28*d* which extends into two pairs of upwardly projecting fingers 28*e* and 28*f*. These fingers engage and receive an arrester assembly 36 which will be further described hereinbelow. The cylindrical upper portion 28*d* also has a projecting tab member or portion 28*g* which is generally bent over to extend horizontally across the open center of the cylindrical portion 28*d*. The tab 28*g* has a through circular opening 28*h* which is generally centered with respect to the cylindrical portion 28*e* and also the cylindrical body portion 28*a*, such that the three are generally coaxial.

Referring again to FIG. 2, each protector unit 16 may have in it an over-voltage protective device or arrester 36. In the prior art protector of this type, the arrester 36 is of the carbon block type, which is illustrated in FIG. 2 by way of example. As mentioned hereinabove, the protector device may also be a dummy device, in which case arrester assembly 36 will not be of the carbon block type, but a dummy unit. The arrester device 36 shown in FIG. 2 has a first element 38 which comprises an outer, insulating and preferably ceramic sleeve portion 40 which coaxially mounts a first cylindrical carbon electrode 42. A second carbon electrode 44 of generally flat disc-like shape and having a through central opening 44*a* rests against an axial end surface 46 of the ceramic sleeve 40. The first electrode 42 is positioned within ceramic sleeve 40 axially spaced from an end surface 46 thereof a sufficient distance to form an arc gap of desired length between its end surface 48 and a facing surface of the carbon electrode 44.

In order to protect against over-current, an additional heat coil assembly 50 is provided in the embodiment illustrated in FIG. 2. The heat coil assembly 50 is illustrated in further detail in FIG. 4, to which reference is also invited. The heat coil assembly includes a coil of wire 52 which is wound around a conductive bobbin 54. One end of the coil of wire is fused to the bobbin 54. A conductive pin 56 extends through the bobbin such that a pointed head 58 thereof projects upwardly outwardly of the bobbin 54. The pin 56 is held in the bobbin 52 by solder. The assembly 50 also has an outer non-conductive generally cylindrical insulating skirt or body 60. The insulating skirt or body 60 has a lower reduced diameter portion 60*a* which, in turn, terminates in an end or bottom tip member or portion 60*b*, all of the same non-conductive or plastic material and preferably formed with body 60. An additional conductive ring 62 is press fitted or otherwise surroundingly engaged with the reduced diameter end portion 60*a* of the body 60.

Conductive ring 62 receives the other end of the coil 52 soldered or otherwise electrically coupled therewith as indicated at reference numeral 55. Preferably the skirt 60 has an elongated through slot 60*c* through which the end portion 52*b* of the coil or is brought out for purposes of engaging the ring 62 while maintaining the coil insulated from electrical contact with the sleeve portion 28 which surroundingly engages the body 60 (see FIG. 5).

Figure 5:
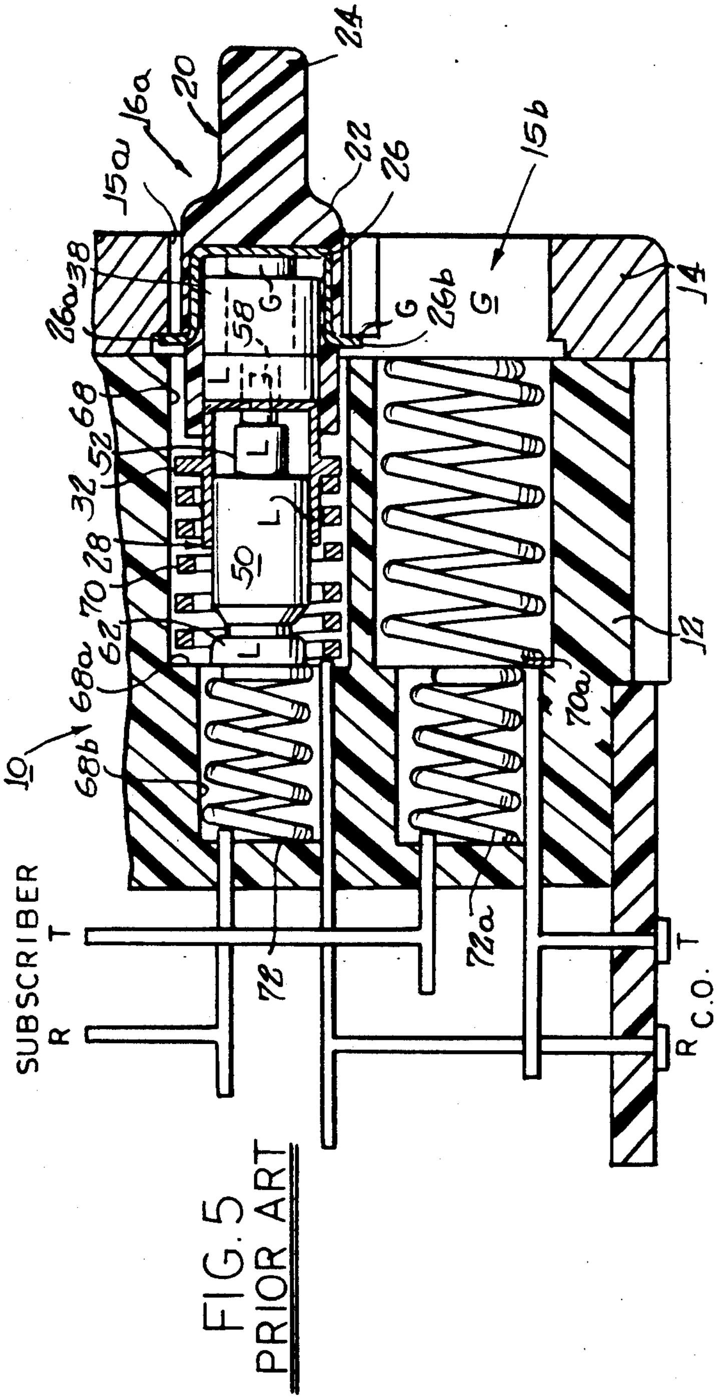
FIG.5 PRIOR ART
FIG. 5 is an enlarged sectional view through a portion of the block of FIG. 1, showing assembly therewith of a protector device of the type show in FIG. 2, in accordance with the prior art practice.

Referring now to FIG. 5, there is shown an enlarged section through two of the receptacles 15 of the block 10 of FIG. 1. For purposes of description, only one of these receptacles is shown equipped with a protector assembly 16 of the type described above with reference to FIGS. 2-4. Diagrammatically illustrated relative to receptacles 15 of FIG. 5 are the respective T and R conductors of an incoming or subscriber's telephone pair and corresponding conductors of a C.O. equipment pair. Each receptacle 15 has a cylindrical cavity 68 for receiving a respective protector assembly such as the protector assembly 16. This cavity 68 extends through the conductive plate 14 and into the non-conductive base or body portion 12 of the block 10. The outwardly projecting end tabs 26*a*, 26*b* of the conductive strip 26 extend through the sidewall portions of the cap 20 to make electrical contact with facing surfaces of the plate 14. As mentioned hereinabove, the plate 14 is electrically coupled with electrical ground. Accordingly, when the protector 16 is fully seated in the receptacle 15, the strip 26 is also electrically connected to ground.

The cavity 68 extends into the base or housing 12 of the block 10 wherein it mounts helical or coil compression spring 70. The compression spring 70 abuts at one end thereof against a shoulder 68*a* leading to a reduced diameter portion 68*b* of the cavity 68. Reduced diameter portion 68*b* of the cavity receives a second similar helical or coil-type compression spring 72. The washer 32 abuts the opposite end of the spring 70 such that the heat coil assembly and cylindrical portion 28*a* of the sleeve assembly 28 extend into and are surrounded by the coil spring 70. The conductive ring member 62 abuts one end portion of the spring 72, the opposite end of which abuts against a bottom or end surface of the cavity portion 68*b*. When the protector 16*a* is fully inserted into the receptacle 15, the conductive sleeve 62 compresses spring 72 somewhat and the washer 32 compresses the spring 70 somewhat. It will be noted that a similar spring 70*a* is shown in an uncompressed condition in the unoccupied receptacle 15.

The R conductor of the subscriber line is in electrically conductive contact with one end of spring 72 and similarly, the R conductor of the C.O.. line is in electrically conductive contact with one end of the spring 70. In the unoccupied cavity 15, the respective T conductors of the subscriber and central office lines are similarly in electrically conductive contact with bottom ends of the respective corresponding springs 70*a* and 72*a*. Therefore, when the protector 16 is inserted in receptacle 15, the compressing of spring 70 by washer 32 establishes electrical connection between the sleeve assembly 28 and the R conductor of the C.O. line pair, and at the same time an electrical connection is established between the conductive ring 62 and the R conductor of the subscriber line.

It will be recalled that end 52*b* of coil 52 is electrically coupled with ring 62 and the other end thereof is soldered to the bobbin 54. The spring 72 urges the heat coil 50 and hence the bobbin 54 into electrical contact with the tab 28*g* of the sleeve 28 where it is sized to engage the sleeve about the through central opening 28*h* therein such that pin 56 projects therethrough. Accordingly, a conductive path from the subscriber R conductor to the C.O. R conductor is provided by way of spring 72, ring 62, bobbin 54, sleeve 28 and spring 70. When in assembled condition as shown in FIG. 5, the projecting arms 28*e* and 28*f* of the sleeve 28 also physically engage and receive the arrester 38 and also are in electrically conductive contact with electrode 44 thereof. Hence, the occurrence on subscriber R conductor of an over-voltage condition which exceeds the rating of the arrester 38, causes an arc between the electrodes 44 and 42. It will be seen that electrode 42 in turn is in electrically conductive contact with ground strip 26 and hence the over-voltage condition is shunted to ground by virtue of this arcing.

In the event of a relatively low voltage, but sustained over-current condition (sometime referred to as "sneak current") on the subscriber's R conductor, sufficient heat will be generated within the coil to melt the solder which holds the pin 56 in place. The tip 58 of the pin will then project upwardly through the opening 44*a* in electrode 44 and into contact directly with electrode 42, thus permanently connecting the subscriber R conductor to ground. In order to remove this ground connection, the protector unit 16 must be replaced.

More particularly in this regard, when the protector unit 16 is assembled, the pin 56 projects upwardly through the aperture 28*h* in the sleeve assembly 28 and also generally in alignment with and partially through the through central opening 44*a* in the carbon arrester electrode 44. The bobbin 54 abuts against an undersurface of the tab 28*g* about the periphery of the through opening 28*h*. However, upon occurrence of a sustained over-current condition on the incoming conductor, the current flowing through the heat coil 52 will cause sufficient heating of the coil to melt the solder which holds the pin 56 in the bobbin 54, such that the spring 72 will urge the heat coil unit 50 upwardly a sufficient amount to cause the end 58 of the pin 56 to project through aperture 44*a* in the carbon arrester electrode 44 and contact the opposite electrode 42 which, it will be remembered, is in contact with ground potential at the ground strip 26.

Figure 6:
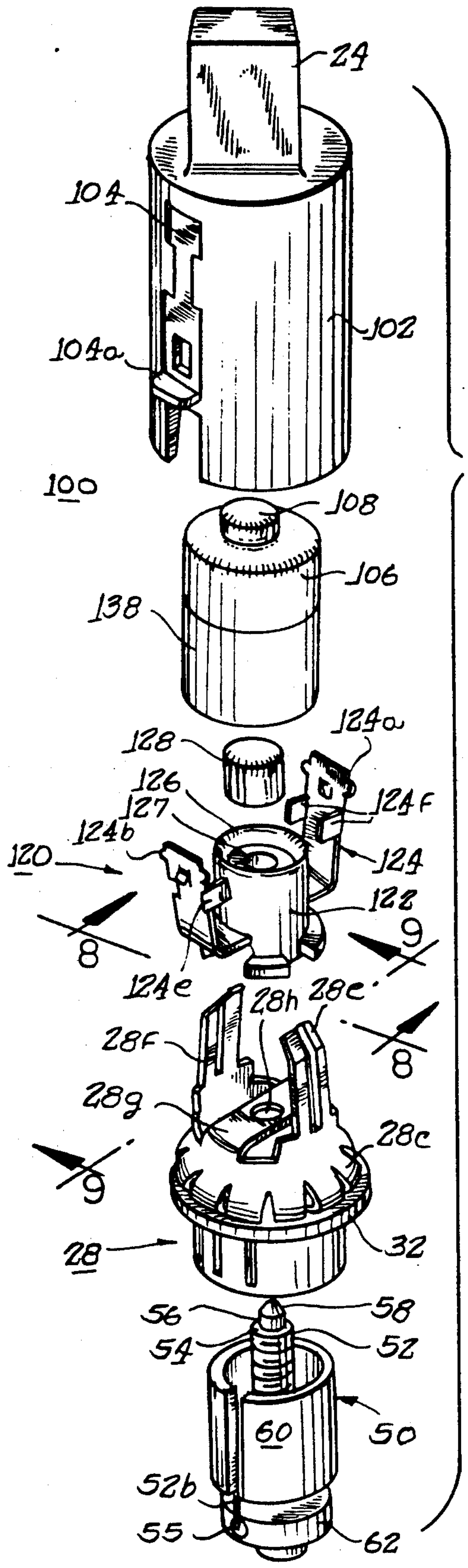
FIG. 6 is an exploded perspective view of the novel and improved protector device in accordance with the present invention.
Figure 7:
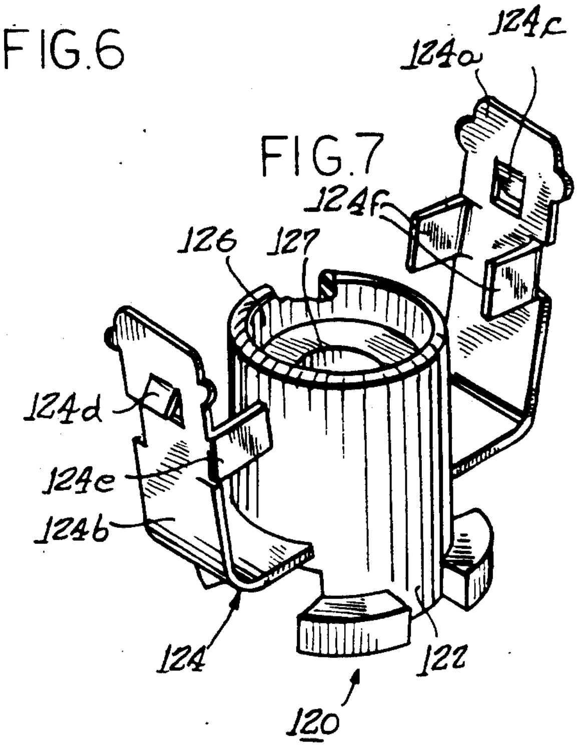
FIG. 7 is an enlarged perspective view of a ground assembly portion of the improved protector of FIG. 6.

Referring now to FIG. 6, there is shown an exploded perspective view of a protector assembly 100 in accordance with the present invention. The protector unit 100 includes a sleeve 28 and a heat coil assembly 50 which are substantially identical to the sleeve 28 and heat coil assembly 50 previously described hereinabove. Accordingly, the like parts and components of these assemblies are indicated by the same referenced numerals used hereinabove and these parts will not be described hereinafter except to the extent necessary for an understanding of the operation of the protector 100 of the invention.

It should be particularly noted that a gas tube type of over-voltage arrester could not be utilized with the protector device or unit 16 as described hereinabove. This is because a gas tube type of arrester provides no means by which the tip 58 of the pin portion 56 of the heat coil assembly can contact the ground electrode, or any other ground portion of the assembly such as the ground strip 26. Accordingly, it has heretofore been considered impossible to provide a heat coil and gas tube type of arrester in a protector device of this type. Moreover, the gas tubes having vent-safe protection have come increasingly into use and demand. Such vent-safe protection is normally provided by supplying a further outer metallic sleeve which surroundingly engages the gas tube and is radially spaced somewhat from the ground electrode thereof to form a secondary ambient air-filled arc gap. However, the cap 20 of the type utilized in protector 16 which interfit with the apertures 15 in a 300 block such as connector block 10, have insufficient internal diameters to accommodate a gas tube with the additional vent-safe sleeve or housing element.

Departing from the previously known protectors as described for example with reference to FIG. 2 hereinabove, the protector of the invention advantageously combines a gas tube over-voltage arrester with a heat coil type of over-current arrester. Moreover, the invention advantageously provides for vent-safe operation of the gas tube arrester and also for fail-safe operation in the event of prolonged over-voltage condition on the gas tube arrester. Such prolonged over-voltage conditions can cause premature breakdown and/or failure of gas tube arresters. A vent-safe gas tube arrester is one in which a secondary air gap is provided to discharge over-voltage in the event of venting out of the gas from the sealed, primary gas-filled discharge gap.

In order to provide fail-safe operation, it has been customary in protectors of other types (i.e., not the 1A or 300-type discussed hereinabove) to mount a solder pellet within a conductive housing and in contact with the gas tube arrester. In this manner, if the gas tube arrester begins to overheat due to a prolonged over-voltage condition, the solder pellet, which is also heated either by thermal contact with the arrester, or by virtue of being in circuit with the communications line and carrying the corresponding line voltage and current, will melt. Generally speaking, the gas tube housing and other conductive metal parts are arranged as such that when the solder pellet melts, the electrode of the gas tube which is connected to the communications line to be protected is shorted to ground, thus grounding the line in preference to both the gas-filled discharge gap and the secondary air discharge gap in a vent-safe type gas tube arrester.

However, unlike the carbon arrester which is a through opening to receive the pin of the heat coil, as illustrated and described above with reference to FIG. 2, the gas tube type of arrester offers no access to its ground side directly from the pin of the heat coil.

As illustrated in FIG. 6, the protector 100 of the invention includes a cap or housing 102 substantially similar to the previously described cap or housing 20. A ground strip 104 is a U-shaped strip having oppositely outwardly projecting ears 104*a*, 104*b*, substantially similar to ground strip 26 previously described. However, ground strip 104 is configured and arranged such that the side portions from which the ears project extend through apertures in the cap 102 (as best viewed in FIG. 9) and extend down opposite exterior surfaces of the cap. In all other respects, the structure and operation of the cap 102 and ground strip 104 are substantially as described above with respect to similar cap 20 and ground strip 22.

The over-voltage arrester comprises a gas tube 106 which has a first electrode 108 normally is contact with circuit ground by virtue of its contact with the ground strip 104 interiorly of the housing or cap 102. A second electrode 110 of the gas tube 106 is generally axially opposite first electrode 108 and as will be seen presently, is designated the line electrode as the same is normally in contact with the communications line to be protected from over-voltage.

In order to achieve over-current protection in the protector 100 having gas tube over-voltage protection, an additional ground assembly means 120 is provided. This assembly 120 comprises a generally cylindrical housing or body 122 of an insulative, non-conductive and preferably plastic material. The housing has an axially central through opening 127 and mounts a generally W-shaped ground bar or ground strip 124. The ground strip 124 has oppositely upwardly projecting contactor or ears 124*a*, 124*b* and a central portion or surface 125 having a through aperture coaxial with aperture 127 of body 122 (see FIG. 9). The body 122 also provides a receptacle 126 for receiving a solder pellet 128 and normally holding the same in physical contact with the container 138 and then with of the gas tube 106.

Figure 8:
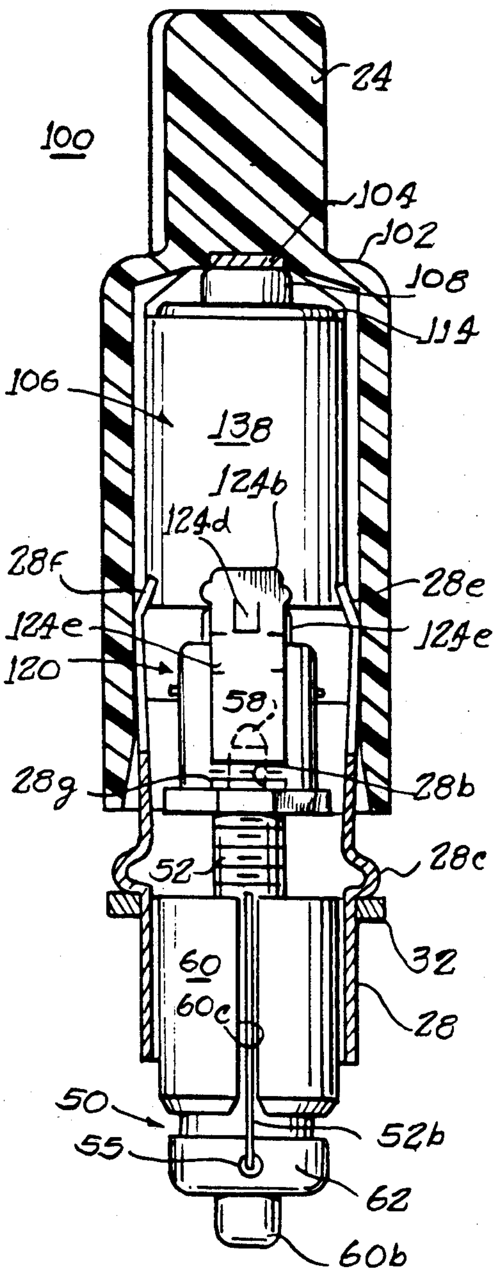
FIG. 8 is an enlarged assembled view taken generally in the plane of line 8—8 of FIG. 6.

A sleeve assembly 28 and heat coil assembly 50 are substantially identical to those illustrated and described above with reference to FIGS. 2 through 4 and will not be further described herein except to the extent necessary to describe the operation of the protector 100 in accordance with the invention. The protector assembly of FIG. 6 is shown in assembled condition in FIG. 8, which is taken generally along the line of 8—8 of FIG. 6, and also in FIG. 9 which is taken along the line 9—9 of FIG. 6, which is in a plane rotated approximately 90° from line 8—8.

Figure 9:
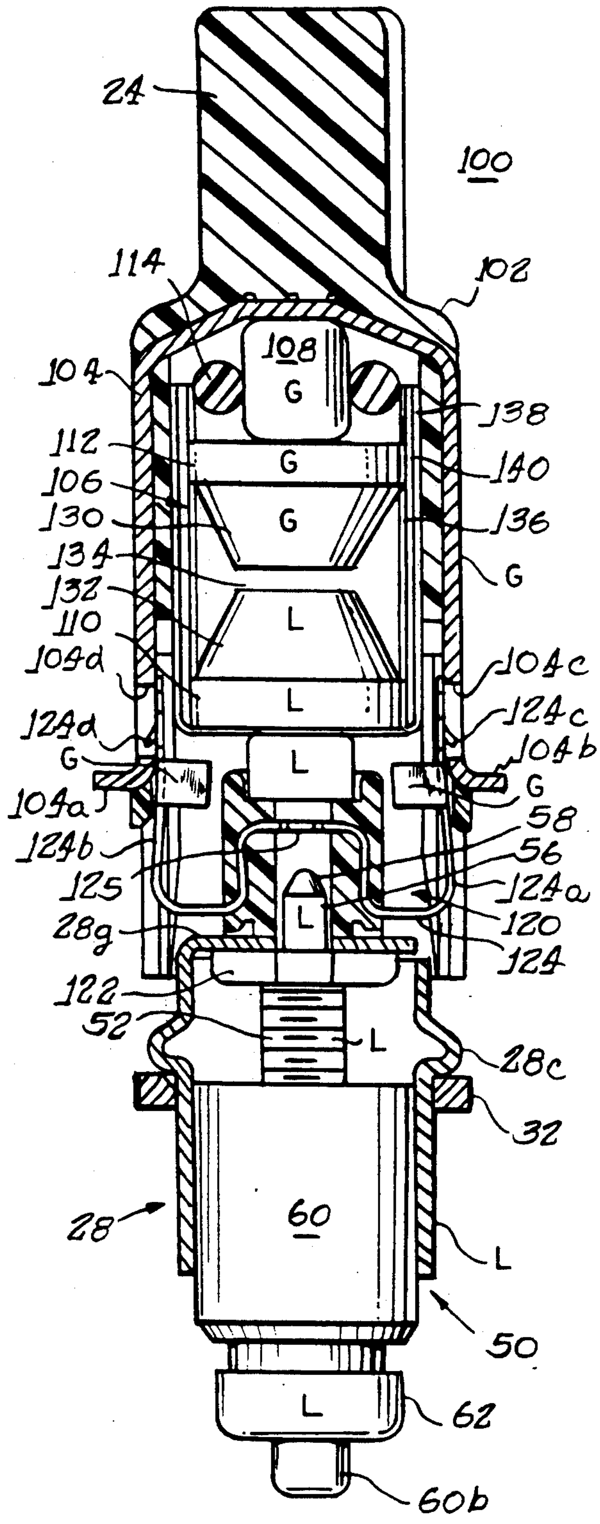
FIG. 9 is an enlarged assembled view taken generally in the plane of the line 9—9 of FIG. 6.

Referring more particularly to FIG. 9, it will be seen that the designations G for ground and L for line have been applied to the various components of the protector to indicate which of these components are normally in contact with ground potential and which are in contact with the communications line during normal operation, that is, in the absence of any over-voltage or any over-current condition which would cause the communications line to be momentarily or permanently shorted to ground by the protector 100.

As illustrated in FIG. 9, the gas tube 106 has been shown, somewhat diagrammatically, in section. The interior of the gas tube includes the upper or ground electrode 108 and the lower or line electrode 110. The ground electrode 108 is electrically coupled with external ground electrode 112 and interior ground electrode 130. Line electrode 110 is electrically coupled with interior electrode 132. Electrodes 130 and 132 define therebetween the arc gap 134. The gas tube components are contained in an airtight container 136 which is filled with a suitable inert gas to achieve the desired breakdown voltage across the gap 134. This breakdown voltage is typically on the order of either 240 or 400 volts DC. In some prior art gas tubes the arc gap 134 was relatively small to facilitate what is known as "narrow gap" technology. In a narrow gap gas tube, the same arc gap 134 will function as a secondary or vent-safe gap. That is, in the event the container 106 becomes unsealed and the gas is vented off, the gap 134, if sufficiently narrow, will still break down or arc at approximately 1000 volts DC. However, such narrow-gap gas tubes have been found to have a relatively short service life, and accordingly, the gas tube 106 is not of this type in the illustrated embodiment.

Rather, additional vent-safe protection is provided in the form of secondary container 138 which is radially spaced slightly from the external ground electrode 112 of the gas tube 106 to form a secondary air gap 140 therebetween. Preferably, in this regard an exterior wall 136 of the gas tube 106 intermediate the respective ground and line electrode portions 110 and 112 is of a non-conductive or insulating material.

In operation, the protector 100 of the invention is installed in terminal block 10 in the same fashion as the protector unit 16 described above with respect to terminal block 10 and receptacle 15 therein. Ground strip tabs 104*a* and 104*b* are in electrically conductive contact with the ground plate 14. Hence, ground potential, is indicated by the capital letter G in FIG. 9 as carried by the ground strip 104 and by electrodes 108, 112 and 130 (the ground electrodes) of the gas tube 106.

In accordance with the invention, ground potential is also brought around to a surface at the opposite axial end of the gas tube 106, that is, between its line electrode 110 and the heat coil 50. This surface is provided by the intermediate or central surface portion 125 of the ground assembly conductive strip 124. In regard the upwardly extending fingers or contact or members 124*a* and 124*b* resiliently engage, and preferably electrically contact the ground strip 104 at lower portions thereof adjacent its tabs 104*a* and 104*b*. Preferably, this engagement is by way of locking tabs 124*c* and 124*d* which releasably lock in complementary through apertures 104*c*, 104*d* provided in the ground strip 104. Additional pairs of tabs 124*e* and 124*f* extend radially inwardly from the upwardly projecting fingers or contactors 124*a* and 124*b*. These tabs contact the container 138, which is in electrical contact with line electrode 110 of the gas tube 106 when the solder pellet 128 melts due to a prolonged over-voltage condition and heating of the gas tube 106.

Accordingly, upon occurrence of an over-voltage condition, the gas tube will normally arc to pass the over-voltage to ground across arc gap 134. Upon failure of the gas tube 106, secondary or vent-safe arc gap 140 may come into play to discharge an over-voltage on the incoming communications line. Upon the occurrence of an over-current or sneak current, the coil 52 will generate sufficient heat to melt the solder connection between pin 56 and bobbin 54 with pin 56. Thereupon, spring 72 will urge the heat coil assembly upwardly until the tip 58 of pin 56 contacts the ground surface 125 provided in the W-shaped ground strip member 124 of ground assembly 120. As mentioned above, the surface 125 is provided with a through aperture which, in operation, will securely receive and make electrical contact with the conical tip member or portion 58 of the pin 56, when the same is advanced due ti ab iyver-current condition as described above. It will be noted that when in assembled condition, the body 122 of the ground assembly 120 snappingly engages with the tab 28*g* of the sleeve 28, and is coaxially centered with the through aperture 28*h* thereof. The arrangement is such that the through aperture in ground surface 125 is also substantially coaxial with aperture 28*h*.

Upon occurrence of a sustained over-voltage or over-current which causes sufficient heating from the gas tube 106, solder pellet 128 will melt. In the case of an over-current, this will occur if the over-current condition is insufficient to cause activation of the heat coil, or upon some failure of the heat coil to operate in its intended fashion to ground the incoming communications line. Upon melting of the solder pellet, the tabs or ears 124*e*, 124*f* will be moved by the action of the springs 70 and 72 into conductive contact with the line container 138 which is in electrical contact with the electrode 110 of the gas tube 106. A secondary ground connection might also be established by the melting of the solder pellet into central through aperture 127 of the body 122 of the ground assembly 120 in such a manner as to continue to contact line electrode 110 of the gas tube and also the ground surface 125. If the solder pellet should melt outwardly and over the sides of the body 122 of the ground assembly 120, it might also contact the ears or tabs 24*e*, 124*f* while still contacting container 138 which is in contact with the line electrode 110. Hence, when a conductive solder pellet is utilized as the fail-safe element 128, alternative methods of grounding can be achieved as well, to assure fail-safe operation.

It should also be noted that in the illustrated embodiment the fail-safe device or solder pellet 128 is not in the line path between the C.O. line and subscriber line. Rather, the pellet is only in thermal and electrical contact with the line terminal of the gas tube 106. Accordingly, a non-conductive meltable element might be utilized in place of a solder pellet to achieve grounding of the line by operation of the spring 72 and contact tabs 124*e* and 124*f* with the container 138 which is in contact with the line electrode 110 of the gas tube 106 as described above. However, in the event of a non-conductive meltable element 128, the secondary grounding methods just described would not be applicable.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A line protector for a communications circuit, said line protector being configured to interfit in a receptacle in a protector block of the type wherein one receptacle and one protector are provided for each of the conductors of a telephone line pair to be protected, and for interfitting in said receptacle in a spring-loaded fashion for making electrical contact respectively with one line of a subscriber's line pair and a corresponding line of a corresponding central office line pair and also for contacting an electrical ground circuit provided in said protector block and within said receptacle, said line protector comprising: a housing; over-voltage arrester means received in said housing and having axially opposite electrodes; ground strip means mounted to said housing for coupling one of said electrodes to electrical ground; over-current arrester means having first line contact means for electrically contacting a first communications line and second line contact means; conductive sleeve means electrically engaged with said second line contact means and having means for electrically contacting a second communications line; said over-current arrester means being in electrical circuit between said first communications line and said conductive sleeve means for joining said second communications line with said first communications line; said sleeve means also being assembled with said over-current arrester means and with said over-voltage arrester means, such that said over-voltage arrester means is held within said housing, said sleeve means having projecting finger means for making an electrical circuit between said communications lines and the other of said electrodes of said over-voltage arrester; and ground assembly means assembled with said sleeve means within said housing and generally intermediate said over-current arrester means and said over-voltage arrester means for contacting said ground strip means and providing a ground surface in an area between said over-voltage arrester means and said over-current arrester means for grounding said communications lines upon occurrence of an over-current condition; wherein said over-current arrester comprises a heat coil assembly including a conductive pin defining an axis and comprising said second line contact means, a conductive bobbin surrounding said pin and soldered thereto, and a conductive coil wound around said bobbin; said first line contact means being electrically coupled with one end of said coil for electrically coupling the same to said first communications line; and wherein said heat coil assembly is positioned for grounding of said pin against said ground surface upon melting of the soldered connection between said pin and said coil and upon application of axial force to said heat coil assembly.

2. A line protector according to claim 1 wherein said over-voltage arrester means comprises a gas tube.

3. A line protector according to claim 2 wherein said gas tube includes means providing a secondary air gap for discharging an over-voltage of predetermined magnitude in event of venting of gas from said gas tube.

4. A line protector according to claim 1 and further including meltable pellet means; and wherein said ground assembly means is axially aligned with said over-voltage arrester and further includes projecting contactor means electrically coupled with said ground surface, receptacle means for mounting said pellet means in thermal contact with said second electrode of said over-voltage arrester means, but out of contact with said ground surface; such that said projecting contactor means will contact said second electrode upon melting of said meltable pellet due to over-voltage or over-current condition on said communications lines and consequent heating of said over-voltage arrester means and upon application of an axial force to said sleeve means.

5. A line protector according to claim 4 wherein said meltable pellet comprises a solder pellet.

6. A line protector according to claim 1 and further including meltable fail safe means meltable due to over-voltage or over-current conditions on at least one of said communications lines and consequent heating of said over-voltage arrester means for grounding of said at least one of said communications lines when over-voltage or over-current conditions exist on said at least one of said communications lines independent of grounding operation of said over-voltage arrester means and said over-current arrester means; and wherein said meltable fail safe means is disposed within the housing out of any current path with said communications lines or with said over-voltage arrester means.

7. A line protector according to claim 6 wherein said meltable fail safe means comprises a non-conductive meltable element.

8. A line protector according to claim 4 wherein said meltable pellet means is located out of any current path with said communications lines or with said over-voltage arrester means.

9. A line protector for a communications circuit, said line protector being configured to interfit in a receptacle in a protector block of the type wherein one receptacle and one protector are provided for each of the conductors of a telephone line pair to be protected, and for interfitting in said receptacles in a spring loaded fashion for making electrical contact respectively with one line of a subscriber's line pair and a corresponding line of a corresponding central office line pair and also for contacting an electrical ground circuit provided in said protector block and within said receptacle said line protector comprising: a housing; an over-voltage arrester received in said housing and having axially opposite electrodes; a ground strip for coupling one of said electrodes to electrical ground; an over-current arrester having first line contact means for electrically contacting a first communications line and second line contact means; a conductive sleeve electrically engaged with said second line contact means and having means for electrically contacting a second communications line, said over-current arrester means being in electrical circuit between said first communications line and said conductive sleeve means for joining said second communications line with said first communications line, said sleeve also being assembled with said over-current arrester and with said over-voltage arrester, such that said over-voltage arrester is held within said housing, said sleeve having projecting fingers for completing an electrical circuit between said communications lines and the other of said electrodes of said over-voltage arrester; and a ground assembly assembled with said sleeve within said housing and between said over-current arrester and said over-voltage arrester for contacting said ground strip and providing a ground surface in an area intermediate said over-voltage arrester and said over-voltage arrester and said over-current arrester for grounding said communications lines upon occurrence of an over-current condition; wherein said over-current arrester comprises a heat coil assembly including a conductive pin defining an axis and comprising said second line contact means, a conductive bobbin surrounding said pin and soldered thereto, and a conductive coil wound around said bobbin; said first line contact means being electrically coupled with one end of said coil for electrically coupling the same to said first communications line; and wherein said heat coil assembly is positioned for grounding of said pin against said ground surface upon melting of the soldered connection between said pin and coil and upon application of axial force to said heat coil assembly.

10. A line protector according to claim 9 wherein said over-voltage arrester means comprises a gas tube.

11. A line protector according to claim 10 where in said gas tube includes means providing a secondary air gap for discharging an over-voltage condition in event of venting of gas from said gas tube.

12. A line protector according to claim 9 and further including meltable pellet; and wherein said ground assembly is axially aligned with said over-voltage arrester and further includes a projecting contactor electrically coupled with said ground surface, a receptacle for mounting said meltable pellet in thermal contact with said second electrode of said over-voltage arrester, but out of contact with said ground surface; such that said projecting contactor will contact said second electrode upon melting of said meltable pellet due to an over-voltage or over-current condition on said communications lines and consequent heating of said over-voltage arrester means and upon application of an axial force to said sleeve.

13. A line protector according to claim 12 wherein said meltable pellet comprises a solder pellet.

14. A line protector according to claim 9 and further including meltable fail safe means meltable due to over-voltage or over-current conditions on at least one of said communications lines and consequent heating of said over-voltage arrester for grounding of said at least one of said communications lines when over-voltage or over-current conditions exist on said at least one of said communications lines independent of grounding operation of said over-voltage arrester and said over-current arrester; and wherein said meltable fail safe means is disposed within the housing out of any current path with said communications lines or with said over-voltage arrester means.

15. A line protector according to claim 14 wherein said meltable fail safe means comprises a non-conductor metlable element.

16. A line protector for a communications circuit, said line protector being configured to interfit in a receptacle in a protector block of the type wherein one receptacle and one protector are provided for each of the conductors of a telephone line pair to be protected, and for interfitting in said receptacles in a spring loaded fashion for making electrical contact respectively with one line of a subscriber's line pair and a corresponding line of a corresponding central office line pair and also for contacting an electrical ground circuit provided in said protector block and within said receptacle, said line protector comprising: a housing; over-voltage arrester means received in said housing and having respective ground and line electrodes; means for coupling said ground electrode to electrical ground; first contact means for electrically contacting a first communications line; second contact means for electrically contacting a second communications line to be joined with said first communications line; means for joining said first and second contact means; one of said first and second contact means also being connected in electrical circuit with said line electrode of said over-voltage arrester for grounding said communications lines upon occurrence of an over-voltage condition; and a fail safe means comprising a meltable element, grounding contactor means, and means for mounting said meltable element in thermal contact with said over-voltage arrester means, but out of any current path in series with said first or second communications lines or with said over-voltage arrester means, such that said grounding contactor means will short across said over-voltage arrester means to connect said communications lines to ground upon melting of said meltable element due to an over-voltage or an over-current condition on said communications lines and consequent heating of said over-voltage arrester means and upon application of an axial force to said grounding contactor means.

17. A line protector according to claim 16 wherein said meltable element is non-conductive.

* * * * *